United States Patent [19]

Mumallah et al.

[11] Patent Number: 4,630,678

[45] Date of Patent: Dec. 23, 1986

[54] IN-SITU FORMATION OF POLYVALENT METAL IONS FOR CROSSLINKING POLYMERS WITHIN CARBONATE ROCK-CONTAINING RESERVOIRS

[75] Inventors: Naim A. Mumallah, Bartlesville, Okla.; Donald D. Bruning, Houston, Tex.; Riley B. Needham, Bartlesville, Okla.

[73] Assignee: Phillips Petroleum Company, Bartlesville, Okla.

[21] Appl. No.: 740,447

[22] Filed: Jun. 3, 1985

[51] Int. Cl.$^4$ .......................................... E21B 33/138
[52] U.S. Cl. ................... 166/281; 166/271; 166/273; 166/294; 166/295; 405/264
[58] Field of Search ............ 166/270, 271, 273, 281, 166/294, 295, 300, 307; 106/900; 405/264; 523/130

[56] References Cited

U.S. PATENT DOCUMENTS

| | | | |
|---|---|---|---|
| 2,747,670 | 5/1956 | King et al. | 166/270 |
| 3,367,417 | 2/1968 | McCabe | |
| 3,396,790 | 8/1968 | Eaton | 166/270 |
| 3,727,689 | 4/1973 | Clampitt | 166/283 |
| 3,749,172 | 7/1973 | Hessert et al. | 166/270 X |
| 3,757,863 | 9/1973 | Clampitt et al. | 166/270 X |
| 3,762,476 | 10/1973 | Gall | 166/294 |
| 3,782,467 | 1/1974 | Hessert | 166/270 X |
| 3,785,437 | 1/1974 | Clampitt et al. | 166/281 |
| 3,785,438 | 1/1974 | Jackson et al. | 166/295 |
| 3,909,423 | 9/1975 | Hessert et al. | 166/270 X |
| 3,926,258 | 12/1975 | Hessert et al. | 166/294 |
| 3,978,928 | 9/1976 | Clampitt | 166/294 |
| 3,981,363 | 9/1976 | Gall | 166/270 |
| 4,018,286 | 4/1977 | Gall et al. | 166/295 |
| 4,039,029 | 8/1977 | Gall | 166/294 |
| 4,068,719 | 1/1978 | Clampitt et al. | 166/282 |
| 4,110,230 | 8/1978 | Hessert et al. | 252/8.55 R |
| 4,290,485 | 9/1981 | Free et al. | 166/281 |
| 4,475,593 | 10/1984 | Friedman | 166/295 X |
| 4,488,601 | 12/1984 | Hammett | 166/270 |
| 4,552,217 | 11/1985 | Wu et al. | 166/270 |

*Primary Examiner*—George A. Suchfield
*Attorney, Agent, or Firm*—J. E. Phillips

[57] ABSTRACT

A water permeability contrast correction process to improve the sweep efficiency of waterflooding in carbonate-bearing strata which involves a sequential injection of (1) an optional aqueous preflush slug to adjust connate water salinity, (2) a slug of aqueous polymer gelable with polyvalent metal cations, such as an polyacrylamide, (3) an acidic aqueous solution effective to dissolve some of the carbonate and at least therefrom polyvalent metal cations specifically calcium or magnesium or both effective to gel said polymer, wherein said aqueous polymer and acidic solution can be injected together in a single slug, followed by (4) an additional aqueous polymer solution injection, wherein the acidic solution provides polyvalent metal cations in-situ for gelation of said polymer slug to preferentially decrease water permeability in highly permeable thief zones, and (5) an aqueous drive fluid.

14 Claims, No Drawings

IN-SITU FORMATION OF POLYVALENT METAL IONS FOR CROSSLINKING POLYMERS WITHIN CARBONATE ROCK-CONTAINING RESERVOIRS

FIELD OF THE INVENTION

The invention pertains to methods for correcting the water permeability contrast of heterogeneous subterranean formations in carbonate-containing reservoirs. In a particular aspect, the invention pertains to the selective plugging within carbonate-containing reservoirs of more permeable strata by the injection therein of gelable aqueous polymer solutions. In a further aspect, the invention pertains to the creation of gel plugs within carbonate-containing subterranean formations under controlled conditions. In a related aspect, the invention pertains to methods of waterflooding.

BACKGROUND OF THE INVENTION

In waterflooding procedures in oil-bearing strata, relatively more permeable zones in the subterranean formation tend to take most of the injected fluids. This may be acceptable initially in sweeping oil from zones of relatively high permeability, but subsequently this tends to become undesirable as the hydrocarbon content of such strata becomes depleted resulting in much of the subsequently injected floodwater or other fluid by-passing the less permeable but still oil-bearing zones and providing little benefit in further hydrocarbon recovery.

Indepth plugging has been effected in the past by the injection of gelable thickened aqueous solutions containing various polymers, either with or followed by the injection of sesquestered polyvalent metal cations, which, on contact with the polymers, cause gelation or crosslinking of the thickened aqueous solutions, thus achieving plugging. The more permeable strata take the injected treating solutions of polymer and injected polyvalent metal cation solutions, and on admixture out in the strata, plugging occurs. This permeability correction then forces subsequent floodwater injections to by-pass the now less permeable subterranean zones, and to push, instead, into the now relatively permeable strata hopefully containing oil to enhance further hydrocarbon recovery.

Variations of the approach have been used in the past, admixing of the polymer and metal cation salt solutions, with or without acid, in various dilutions and using various polymers. It has been a relatively costly procedure. Sequestering agents used have been employed to avoid too rapid a reaction of the polyvalent metal cation compound solutions, to retard their effect somewhat, in order to delay the onset of gelation until the injected solution has penetrated deeper into the subterranean formation. The metal cation compounds themselves are reasonably expensive, and large volumes are required. Yet, no better approach has been developed.

BRIEF DESCRIPTION OF THE INVENTION

We have discovered a sequence of treatments that is applicable to carbonate formations or to formations containing carbonate streaks, which process employs the sequential injection of polymer solution, of dilute acid, then of polymer solution.

Our process eliminates the heretofore required use of expensive sequestering agents and metal compounds. We achieve better control of permeability correction in carbonate-bearing formations in this manner and can better effect gelation farther out in the reservoir thereby eliminating well-bore face plugging problems since the release of divalent cations from the carbonate rock with dilute acid is a moderately slow process.

In accordance with our invention, our process employs the sequential injection into a carbonate-containing subterranean strata requiring permeability correction of a polymer solution, followed by dilute aqueous acid injection to form in-situ polyvalent metal cation solutions, followed subsequently by a further aqueous polymer solution injection to further transport the reactive compounds out into the subterranean formation where plugging occurs and permeability correction is achieved.

By our approach, the cost of permeability contrast corrections in carbonate-bearing formations is reduced by at least 50 percent. Our process is applicable to the carbonate-bearing formations requiring permeability corrections, either because of inherent variations in permeability in various strata, or because of fractures which may have occurred in various treating procedures. It is also applicable to sandstone formations with carbonate streaks.

DETAILED DESCRIPTION OF THE INVENTION

In accordance with our invention, we provide a water permeability contrast correction process applicable to carbonate-bearing strata to improve the sweep efficiency of waterflooding which process involves the sequential injection of (1) an optional aqueous preflush slug to adjust connate water salinity, (2) an aqueous polymer slug capable of gelling when in admixture with a crosslinking polyvalent metal cation at a pH in the gelation range, (3) an aqueous acidic slug comprising a water-soluble acid capable of reacting with the carbonate strata to release polyvalent metal cations therefrom effective to crosslink the polymer and which acid forms substantially water-soluble salts with the polyvalent metal cations, (4) an additional aqueous polymer slug and, finally, (5) an aqueous drive fluid.

In an optional procedure, the initially injected aqueous polymer solution (2) and the aqueous acidic solution (3) can be premixed, and injected together, since the polyvalent metal cation crosslinking agents are produced in the strata in-situ. Under the influence of the acids this in-situ metal cation release is moderately slow under subterranean conditions, such that the solutions penetrate a significant distance into the strata before gelation occurs.

As the acidic slug gradually dissolves the carbonate rock which is predominantly calcium magnesium carbonates, frequently with some traces of iron, the release of the calcium ions and magnesium ions, and iron ions where present, triggers the in-situ gelation of the polymer slug, thus effecting preferential decrease in water permeability of the otherwise highly permeable thief zones.

In a preferred mode of our invention, the initial aqueous polymer slug is followed by brine, then the in-situ cation-generating aqueous acid, then preferably another brine flush, and then a further aqueous polymer slug.

The method of our invention allows placement of the polymer aqueous slug far out into the subterranean formation prior to gelation initiated by the in-situ formation of polyvalent metal cation crosslinking agents. The following polymer slug then provides additional gelation effects. Alternatively, initial admixing of polymer and acid provide a nearer to the well gelation in the subterranean formation. This provides ease and balance of application and control as desired.

It is an object of our invention to provide a permeability contrast correction method for plugging of the more permeable strata in carbonate-bearing subterranean formations. It is also an object of our invention to provide methods to provide both indepth as well as near well permeability contrast correction capabilities. A further object of our invention is to provide methods for treating of underground formations in which the plugging or gelation is delayed. It is a particular object of our invention to provide a more economical method of subterranean gelation formation than heretofore available, reducing the number of reagents required.

Other aspects, objects, and the various advantages of our invention will become apparent upon reading the specification and the appended claims.

In accordance with our invention, a sequential method is employed which comprises the sequential injection of (1) an aqueous preflush to adjust connate salinity, (2) an aqueous polymer slug either admixed with or followed by (3) an aqueous acidic slug, and then followed by (4) an additional polymer slug, and (5) an aqueous drive fluid.

POLYMERS

Polymers suitable for use in our invention are those capable of gelling in the presence of polyvalent metal ion crosslinking agents within a gelation pH range. Suitable polymers include biopolysaccharides, cellulose ethers, and acrylamide-based polymers including polyacrylamides and partially hydrolyzed polyacrylamides.

Suitable cellulose ethers include those disclosed in U.S. Pat. No. 3,727,688 (incorporated herein by reference). Particularly preferred cellulose ethers include carboxymethylhydroxyethyl cellulose (CMHEC) and carboxymethyl cellulose (CMC).

Suitable biopolysaccharides include those disclosed in U.S. Pat. No. 4,068,714 (incorporated herein by reference). Particularly preferred is polysaccharide B-1459 which is a biopolysaccharide produced by the action of *Xanthomonas campestris* bacteria. This biopolysaccharide is commercially available in various grades under the trademark Kelzan TM (Kelco Company, Los Angeles, Calif.).

Suitable acrylamide-based polymers include those disclosed in U.S. Pat. No. 3,749,172 (incorporated herein by reference). Particularly preferred are the so-termed partially hydrolyzed polyacrylamides possessing pendant carboxylate groups through which crosslinking can take place. Thermally suitable copolymers of acrylamide, such as poly(N-vinyl-2-pyrrolidone-co-acrylamide) and poly(sodium-2-acrylamido-2-methyl-1propanesulfonate-co-acrylamide), are particularly suitable for applications in high salinity environments at elevated temperatures. Various terpolymers also are useful in the present process, such as terpolymers derived from acrylamide and N-vinyl-2-pyrrolidone comonomers with lesser amounts of termonomers such as vinyl acetate, vinylpyridine, styrene, methyl methacrylate, and the like.

Other miscellaneous polymers suitable for use in the present invention include partially hydrolyzed polyacrylonitriles, polystyrene sulfonates, lignosulfonates, methylolated polyacrylamides, and the like.

Presently preferred are the acrylamide-based polymers, which as used herein include polyacrylamides and the partially hydrolyzed polyacrylamides, and encompassing terpolymers possessing pendant carboxylate and/or carboxylic acid groups through which crosslinking (gelation) can occur.

The concentration or water-thickening amount of the water-soluble/dispersible polymer in the aqueous solution/dispersion can range widely and be as suitable and convenient for the various polymers, and for the degree of gelation needed for particular strata. Generally, the concentration of polymer in its aqueous solution/dispersion (before admixing with crosslinking components) is about 1,000 to 20,000 ppm, preferably about 2,000 to 5,000 ppm.

Any suitable procedures for preparing the aqueous admixtures of the crosslinkable polymer can be used. Some polymers may require particular mixing conditions, such as slow addition of finely powdered polymer into the vortex of stirred water, alcohol pre-wetting, protection from air (oxygen), preparation of stock solutions from fresh rather than salt water, or the like, as is known for such polymers.

In general, the aqueous polymer solutions gel within a gelation pH range, generally considered to be within the pH range of about 3 to 7. Inherently, in accordance with our procedure, these conditions are met as the creeping acidic solution dissolves the carbonate strata, such as dolomite, and forms acidic aqueous solution of calcium ions, magnesium ions, and where present ferrous and/or ferric ions. Alternatively, calculations can be made as to the requirement for acidity, polyvalent metal cation, depending on the amount of polymer injected, strata porosity, and the like, in order to provide a suitable balance.

ACIDS

In general, water-soluble inorganic and organic acids can be used in accordance with our process. The acids employed should be those which are water-soluble, and which in reaction with carbonate deposits produce substantially water-soluble salts of calcium, of magnesium, and where present of iron.

Inorganic acids which are useful include such as hydrochloric acid (muriatic acid), hydrobromic acid, and sulfamic acid. Presently it is recommended that acids such as sulfuric acid, sodium bisulfate, and phosphoric acid, not be employed because of the possibility of reaction to form insoluble calcium precipitates which might impede the progress of either the acidic front or the following polymer front. Nitric acid usually is not employed as being deleterious to equipment, more so, than some of the others, though in theory it is operable.

Carboxylic acids employable include any of those meeting our general definition and recommendation, such as the mono- and dicarboxylic acids of up to about 8 carbon atoms, including typically formic, acetic, propionic, butyric, valeric, caproic acids, citric acid, and the like, either as the acid, the anhydride, or the acid halides.

Most commonly employed of the various acids are muriatic acid, acetic acid, and citric acid, for economy and availability.

The suitable acids can be used as is in many instances, or more conveniently and preferably considering the equipment usually used for pumping, can be diluted with fresh or salt water for injection purposes to volumes convenient for injection. When desired, inhibitors well known in the art can be employed for corrosion protection.

In the option where desired to admix the first aqueous polymer solution with the aqueous acid, then the polymer can be dispersed in a given amount of water, preferably fresh water, and to this aqueous dispersion then added desired amounts of dilute acid.

VOLUME OF AQUEOUS POLYMER SLUG

The total quantity of in-situ gelable aqueous polymer treating solution employed in the initial slug can be expressed in terms of the pore volume of the area to be treated. For example, if a region (one or more stratum or portion thereof) to be treated is taking upwards of 80 volume percent of the volume of injected fluid (floodwater), a packer can be set to direct the treating composition into this zone. The quantity of the treating comiposition can vary widely, depending on the effects desired, but generally suggested is about 100 to 120 percent of the pore volume of the zone to be treated with the upper limit being governed merely by the practical limitations of pumping expense and chemical costs.

In general, according to our method of treatment, about one-half, more usually 30 to 70 volume percent, of the total desired aqueous polymer solution is injected in the first slug. This, then, is followed by the calculated amount of the acid slug. Thereafter, the remaining volume of aqueous polymer solution, in the corresponding range of about 70 to 30 volume percent of the total polymer to be employed, is injected as the following slug.

INTERVENING BRINE SLUGS

In a preferred mode, in accordance with our invention, the initial aqueous polymer slug is followed by a brine slug. The aqueous acid in-situ cation-forming slug also preferably is followed by brine slug prior to the second aqueous polymer slug. This approach generates a far-out effective gelation.

The amounts (volumes) of the intervening brine slugs can range widely, but frequently are from about ½ to 2 volumes, more usually about equal volume, relative to the just prior slug.

The brine employed generally and preferably is a sodium chloride brine, or other brine as discussed relative to the optional preflush.

PREFLUSH (OPTIONAL)

Prior to employment of the gelable compositions, the strata can be subjected to a connate water conditioning preflush step. The optional preflush employs an aqueous solution with a lower level of hardness (calcium and magnesium ions) and/or total dissolved solids (tds) than that of the stratum connate water, and preferably containing substantially no hardness cations though it may be saline. The purpose of the preflush is to alter the salinity of the connate water by flushing the formation, generally with about one to three times the pore volume of the zone to be treated.

Since it is known that enhanced oil recovery chemicals such as surfactants and polymeric viscosifiers are absorbed and/or precipitated to a greater extent in the presence of electrolytes and hardness cations in particular, the preflush can alleviate this potential problem by sweeping out at least a function of such electrolytes. A typical NaCl preflush brine contains, e.g., on the order of about 0.2 to 2 weight percent total dissolved solids.

Sodium chloride is the generally preferred salt although other sodium salts such as the nitrate, sulfate, acetate, and the like, are suitable. It is contemplated the even more concentrated salt solutions can be used for preflushing provided that no incompatibility results with the dissolved polymeric viscosifier such as polyacrylamide.

The preflush can contain polymeric thickeners such as partially hydrolyzed polyacrylamides and conventional sacrificial agents such as sodium carbonate, sodium polyphosphate, and the like. Such as preflush slug possesses better mobility control than an unthickened preflush slug and improves sweep efficiency by contacting, e.g., areas unswept by water used in any previous waterflooding. Heterogeneous zones of varied and higher salinity thusly can be modified on the average to a lower salinity range more suitable for practicing the instant process.

SUBSEQUENT DE-GELATION

It sometimes is desirable to plug a portion of an underground formation so as to divert subsequently injected treating fluids into certain zones of the formation and yet be able to remove the stoppages from the formation after the particular treatment is completed. Gel-forming compositions are advantageous, since gel-breaking can be accomplished, when desired, by appropriate subsequent treatment.

The plug can be substantially reduced or eliminated following the gelation at any time convenient thereafter by injecting an agent such as sodium hypochlorite which is recognized in the art for its effectiveness in degrading polymeric viscosifiers such as the polyacrylamides, which upon contacting the gel-plug in the formation gradually causes dissolution thereof.

AQUEOUS DRIVE FLUID

An aqueous drive generally follows the permeability contrast correction process of our invention. The aqueous drive employs available field brines and/or fresh water if the latter is available.

The aqueous drive, since it follows our in-situ gelation treatment, is diverted to the formerly relatively less permeable but still oil-rich zones since the permeability contrast correction process slows or substantially prevents the flow of aqueous drive fluid through the formerly more permeable but now oil-poor zones (so-called thief zones). A successful permeability contrast correction operation generally is signaled at the production well by a reduction of the water/oil ratio in the produced fluid.

Subsequent to the permeability contrast correction, the water/oil ratio may gradually again increase after prolonged injection of the drive water. A gelation retreatment of the formation can be considered appropriate, if desired.

These gel-plugging techniques also are useful during well workovers, in fracture treatments, and to correct the injection profile of a well by indepth sealing of communicating streaks of relatively high permeability so that flooding fluids will enter the formation in a more useful front profile.

EXAMPLES

Examples provided are intended to assist one skilled in the art to a further understanding of our invention. Particular materials employed should be considered as exemplary and not limitative. The Examples are part of our disclosure. The specification including text, Examples, data, and claims, should be viewed as a whole in considering the reasonable and proper scope of our invention.

EXAMPLE I

This example supports the feasibility of solubilizing a polyvalent metal cation, $Ca^{++}$ and/or $Mg^{++}$, from carbonate rock. Two gram samples of ground carbonate (Baker dolomite) were contacted with 20 mL portions of aqueous acetic acid containing, respectively, 1,000; 2,500; and 10,000 ppm of acetic acid. The amount of $Ca^{++}$ released into solution was measured by a calcium ion selective electrode which measures only free calcium ion, i.e., any calcium existing as ion-pairs in solution would not be detected. The results are summarized in Table I:

TABLE I

| Equilibration of Carbonate Rock With Aqueous Acetic Acid | | |
|---|---|---|
| Run No. | Acetic Acid (ppm) | $Ca^{++}$ Released (ppm) |
| 1 | 10,000 | 842 |
| 2 | 2,500 | 281 |
| 3 | 1,000 | 128 |
| 4 | 0* | 10 |
| 5 | 0$^a$ | 8 |
| 6 | 1,000$^b$ | 112 |

*The rock was slurried in water.
$^a$The rock was slurried with aqueous sodium acetate (10,000 ppm acetate).
$^b$The rock was slurried with an aqueous solution containing 1,000 ppm acetic acid and 1,000 ppm acetate (sodium acetate salt).

Referring to the results in Table I, it is evident that the release of $Ca^{++}$ from the carbonate rock is increased as the acetic acid concentration is increased from 1,000 ppm to 10,000 ppm (see Runs 1, 2, 3). Run 4 and Run 5 illustrate, respectively, that water and aqueous sodium acetate (10,000 ppm acetate) did not effectively solubilize $Ca^{++}$ from the rock surface; at least there appeared to be no net increase in solution concentration of free $Ca^{++}$ ions during the relatively shrt test period. Run 6 in view of Run 3 indicates that the buffering action of sodium acetate in the test solution did not exhibit any significant effect on $Ca^{++}$ release from the rock at the 1,000 ppm acetic acid level.

The Baker dolomite rock used in the above tests is considered to be $MgCa(CO_3)_2$ which presumably should release equal molar amounts of $Mg^{++}$ and $Ca^{++}$, although the $Mg^{++}$ concentration was not determined. Both of these divalent metal ion species are suitable for crosslinking aqueous solutions of polymeric viscosifiers.

Additional observations were made on individual mixtures of acetic acid with ground-up rock at different acid concentrations for specified time intervals to determine the approximate time period required for the $Ca^{++}$ ion concentration to level off. The results are summarized in Table II:

TABLE II

| Equilibration of Carbonate Rock With Aqueous Acetic Acid and With Aqueous Acetic Acid/Sodium Acetate | | | | | |
|---|---|---|---|---|---|
| | ppm $Ca^{++}$ Released | | | | |
| Run No. | 1 Hour | 2 Hours | 4 Hours | 8 Hours | 77 Hours |
| 7** | 220 | 232 | 248 | 253 | 261 |
| 8*** | 136 | 144 | 160 | 162 | 161 |

**This solution contained 2264 ppm acetic acid.
***This solution contained 1917 ppm acetic acid and 2500 ppm acetate (as sodium acetate).

Referring to the results in Table II, it is evident that in each Run 7 and 8 that the concentration of $Ca^{++}$ ions essentially leveled out at about 4 hours. These results indicate that at room temperature that the reaction to release $Ca^{++}$ from the dolomitic rock is about 85 percent complete within the first hour, and that after 4 hours the reaction is about 100 percent complete. These results indicate that the reaction of acetic acid with carbonate rock is sufficiently rapid that the acid would be spent near the injector wellbore and any increase in permeability of the formation due to acid would be restricted to that region of the formation.

EXAMPLE II

This example describes core runs which support the operability of the instant process.

Baker dolomite cores measuring 5 inches in length and one inch in diameter were cast in epoxy resin and saturated under 70 psi back pressure with 50,828 ppm NaCl brine. The core permeability to brine was determined in the first inch of the core and in the middle section of the core before passing various fluids through the cores positioned in a 40° C. temperature bath as described in more detail hereinbelow.

(a) Core-1 (Control) (5 inches long $\times$ 1 inch diameter)

This Core-1 Run demonstrated that the sequential injection of 1, 1, 2, 1, 4 pore volumes, respectively, of brine (50,828 ppm NaCl), sodium acetate (7,949 ppm sodium acetate in 50,828 ppm NaCl brine), brine (50,828 ppm NaCl), acetic acid (5,000 ppm acetic acid in 50,528 ppm NaCl brine), and brine (50,828 ppm NaCl) caused the release of approximately the stoichiometric amount of $Mg^{++}$ and $Ca^{++}$ ions from the rock surface based on the moles of acid injected and assuming that two moles of acid cause the release of one mole of divalent cation.

The Core-1 effluents were collected and analyzed for sodium, calcium, magnesium, and iron. The sodium analysis showed that produced sodium was about equal to injected sodium. The iron analysis showed no produced iron. The analyses for calcium and magnesium indicated that there was no release of these cations due to the passage of sodium acetate through Core-1, however, the divalent ions were released as the acetic acid passed through the core. In terms of material balance, $1.08 \times 10^{-3}$ mol (65 mg) of injected acetic acid resulted in the release of $2.77 \times 10^{-4}$ mol (11.68 mg) $Ca^{++}$ and $3.21 \times 10^{-4}$ mol (8.12 mg) $Mg^{++}$. The total amount of divalent ions produced ($5.98 \times 10^{-4}$ mol) is about 10 percent more than that required by the stoichiometry.

In the first inch of Core-1, the initial permeability to brine was 14 millidarcies and the final permeability after the flood treatment was 16 millidarcies, whereas in the middle three inches of the core, the initial and final permeabilities were equal, i.e., 40 millidarcies.

(b) Core-2 (Control) (6 inches long $\times$ 1 inch diameter)

This Core-2 Run demonstrated that a residual resistance factor was established by polymerflooding a dolomite core using the sequential injection of aqueous polyacrylamide, NaCl brine (20,000 ppm $Na^+$), and aqueous polyacrylamide. Core-2 was prepared in the same manner as Core-1, and was flooded sequentially with 2, 0.7 and 2 pore volumes of polymer, brine and polymer. The polyacrylamide had a molecular weight of about $2 \times 10^6$ and a 22 percent degree of hydrolysis. The initial permeability in the first inch of Core-2 was 45 millidarcies and the initial permeability in the middle four inches of Core-2 was 94 millidarcies.

After the passage of 10.5 pore volumes of brine drive, the residual resistance factors, respectively, in the first inch and middle four inches of Core-2 were 4.9 and 4. These values are compared to those of the invention runs hereinbelow.

(c) Core-3 (Control) (6 inches long × 1 inch diameter)

This Core-3 Run demonstrated that the sequential injection of 2, 0.1, 0.4, 0.2, and 2 pore volumes, respectively, of polymer, brine, calcium acetate, brine, polymer failed to establish residual resistance factors greater than those established above in Core-2 wherein the sequence polymer, brine, polymer was used. After the passage of 15 pore volumes of brine drive, the residual resistance factors, respectively, in the first inch and middle four inches of Core-3 were 2.7 and 3.1. The initial permeabilities, respectively, in the first inch of Core-3 and the middle four inches of Core-3 were 64 millidarcies and 71 millidarcies.

(d) Core-4 (Invention) (6 inches long × 1 inch diameter)

This Core-4 Run demonstrated the effectiveness of the inventive injection sequence of polymer, brine, acetic acid, brine, and polymer to establish significant residual resistance factors, viz., 4.7 and 5.0, respectively, in the first inch and middle four inches of the dolomite core. The injection sequence consisted of 2. 0.2, 1.25, 0.5 and 1 pore volumes of polymer, brine (20,000 ppm NaCl), acetic acid (10,000 ppm), brine, and polymer. The initial permeabilities, respectvely, in the first inch of Core-4 and the middle four inches of Core-4 were 43 millidarcies and 63 millidarcies.

(e) Core-5 (Invention) (6 inches long × 1 inch diameter)

This Core-5 Run demonstrated the effectiveness of the inventive injection sequence of polymer, brine, acetic acid, brine, and polymer to establish significant residual resistance factors, viz., 3.9 and 6.7, respectively, in the first inch and middle four inches of the dolomite core. The injection sequence consisted of 2, 0.1, 0.3, 0.2, and 1.3 pore volumes of polymer, brine (50,828 ppm NaCl), acetic acid (10,000 ppm), brine, and polymer. The initial permeabilities, respectively, in the first inch of Core-5 and the middle four inches of Core-5 were 88 millidarcies and 97 millidarcies.

Results of the five Core Runs are summarized in Table III:

TABLE III

Core Runs in Dolomite Rock Samples*

| Core Run | Type of Run | Flooding Sequence | Initial Permeability (Mid-section of Core) (md) | Residual Resistance Factors (Mid-section of Core) |
|---|---|---|---|---|
| 1 | Control | (B-SA-B-AA-B)$^a$ | 40 | NP$^f$ |
| 2 | Control | (P-B-P)$^b$ | 94 | 4 |
| 3 | Control | (P-B-CA-B-P)$^c$ | 71 | 3.1 |
| 4 | Invention | (P-B-AA-B-P)$^d$ | 63 | 5.0 |
| 5 | Invention | (P-B-AA-B-P)$^e$ | 97 | 6.7 |

*Residual Resistance Factors shown refer to the "middle three or four inches of the core" rather than to the "first inch of the core".
$^a$(B-SA-B-AA-B) represents the injection sequence: brine-sodium acetate-brine-acetic acid-brine.
$^b$(P-B-P) represents the injection sequence: polymer-brine-polymer.
$^c$(P-B-CA-B-P) represents the injection sequence: polymer-brine-calcium acetate-brine-polymer.
$^d$(P-B-AA-B-P) represents the injection sequence: polymer-brine-acetic acid-brine-polymer.
$^e$Same as footnote d.
$^f$NP represents "Not Pertinent" because no polymer was injected for crosslinking (no residual resistance factor was established).

Referring to the inventive Core Runs 4 and 5 in Table III, it is evident that the inventive injection sequence of polymer-brine-acetic acid-brine-polymer established the highest residual resistance factors in the treated dolomite cores. The polymerflooded Core Runs 2 and 3 utilizing, respectively, the sequences polymer-brine-polymer and polymer-brine-calcium acetate-brine-polymer gave residual resistance factors on the order of 20 to 30 percent lower than those observed in invention Core Runs 4 and 5. Control Core Run 1 did not involve the injection of crosslinkable polymer so no residual resistance was developed in the system although divalent metal ions were released by the injected acetic acid.

The results in Core Runs 4 and 5 of Table III indicate that sufficient divalent ions are released within the core by the acetic acid slug to effect crosslinking of the injected polymer within the core to establish permeability contrast correction reflected by the higher residual resistance factors.

The disclosure, including data, has illustrated the value and effectiveness of our invention. The Examples, the knowledge and background of the field of the invention and the general principles of chemistry and of other applicable sciences have formed the bases from which the broad descriptions of our invention including the ranges of conditions and the generic groups of operant components have been developed, and formed the bases for our claims here appended.

I claim:

1. A method for treating a carbonate-containing underground formation wherein said carbonate comprises a calcium or calcium/magnesium carbonate which method comprises the sequential injection of
  (A) effective permeability control proportions of an in-situ gelable composition comprising effective ratios of:
    (a) water, and (b) at least one polymer capable of gelling with a crosslinking agent selected from calcium and magnesium irons within an acidic gelation pH range,
  (B) an aqueous solution of a water-soluble acid in amounts sufficient to dissolve a portion of said carbonate, thereby liberating calcium or calcium and magnesium ions, and
  (C) an aqueous solution of the polymer of (A), thereby gelling in-situ said polymer of steps (A) and (C) with said calcium or calcium and magnesium ions and effecting permeability contrast correction.

2. The method of claim 1 wherein said polymer of steps (A) and (C) is present in said aqueous polymer composition in an amount of about 500 to 10,000 ppm.

3. The method of claim 1 wherein said polymer of steps (A) and (C) is selected from the group consisting of biopolysaccharides, cellulose ethers, acrylamide-based polymers, partially hydrolyzed polyacrylamides, partially hydrolyzed polyacrylonitriles, polystyrene sulfonates, lignosulfonates, methylolated polyacrylamides, and mixtures.

4. A method according to claim 3 wherein said polymer comprises polyacrylamide and said acid is muriatic, citric or acetic.

5. The method of claim 4 wherein said polyvalent metal cation is selected from the group consisting of $Ca^{2+}$, $Mg^{2+}$ and mixtures.

6. The process of claim 4 further preceding at least one of said steps (B) and (C) with an aqueous brine slug and wherein said polymer is polyacrylamide.

7. The process of claim 1 further preceding said step (A) by an aqueous preflush slug to adjust connate water salinity.

8. The process of claim 1 further preceding at least one of said steps (B) and (C) with an aqueous brine slug.

9. A process of controlling sweep efficiency for enhancing oil recovery in a carbonate-containing subterranean formation which comprises the sequential injection of effective quantities of:
(1) a first aqueous thickened slug of a gelable polymeric viscosifier,
(2) an aqueous acid solution in amounts sufficient to effectuate dissolution of a portion of said carbonate and liberation therefrom of polyvalent metal cations effective to cause gelation of said aqueous thickened slug;
(3) a second aqueous thickened slug of a gelable polymeric viscosifier, and
(4) an aqueous drive fluid;

thus effecting diversion of said aqueous drive fluid to less permeable oil-rich zones.

10. The process of claim 9 further preceding said step (1) by an aqueous preflush slug to adjust connate water salinity.

11. The method of claim 10 wherein the polymer is present in said thickened slugs in an amount of about 500 to 10,000 ppm.

12. The process of claim 11 wherein said polymer is selected from the groups consisting of bipolysaccharides, cellulose ethers, acrylamide-based polymers, partially hydrolyzed polyacrylamides partially hydrolyzed polyacrylonitriles, polystyrene sulfonates, lignosulfonates, methylolated polyacrylamides and mixtures.

13. A method according to claim 12 wherein the polymer comprises partially hydrolyzed polyacrylamide and said acid is citric, hydrochloric or acetic.

14. The process of claim 9 further preceding at least one of said steps (2) and (3) with an aqueous brine slug.

* * * * *

UNITED STATES PATENT AND TRADEMARK OFFICE
CERTIFICATE OF CORRECTION

PATENT NO. : 4,630,678

DATED : December 23, 1986

INVENTOR(S) : Naim A. Mumallah et al

It is certified that error appears in the above-identified patent and that said Letters Patent is hereby corrected as shown below:

Column 12, claim 12, line 2, delete "groups" and insert therefor ---group---.

Signed and Sealed this

Seventh Day of April, 1987

Attest:

DONALD J. QUIGG

Attesting Officer

Commissioner of Patents and Trademarks